United States Patent
Burdick

(10) Patent No.: US 6,971,638 B2
(45) Date of Patent: Dec. 6, 2005

(54) FENCE SPACER

(75) Inventor: Brett R. Burdick, Knoxville, TN (US)

(73) Assignee: Fi-Shock, Inc, Knoxville, TN (US)

( * ) Notice: Subject to any disclaimer, the term of this patent is extended or adjusted under 35 U.S.C. 154(b) by 0 days.

(21) Appl. No.: 10/645,916

(22) Filed: Aug. 21, 2003

(65) Prior Publication Data

US 2005/0040381 A1 Feb. 24, 2005

(51) Int. Cl.$^7$ ............................................. E04H 17/02
(52) U.S. Cl. .......................... 256/57; 256/10; 256/32; 256/47; 256/DIG. 3
(58) Field of Search .............................. 256/1, 10, 32, 256/33, 47–49, 35, 52–54, 56, 57, DIG. 3

(56) References Cited

U.S. PATENT DOCUMENTS

| | | | |
|---|---|---|---|
| 353,129 A | | 11/1886 | Gholson |
| 466,932 A | * | 1/1892 | Cornell .......................... 47/46 |
| 617,442 A | * | 1/1899 | Leatherman ................. 256/35 |
| 631,272 A | * | 8/1899 | Bonta .......................... 256/58 |
| 1,618,312 A | | 2/1927 | Shipps |
| 1,845,032 A | | 2/1932 | Baum |
| 4,093,187 A | * | 6/1978 | Robinson ..................... 256/49 |
| 4,299,048 A | | 11/1981 | Bayes |
| 4,623,127 A | | 11/1986 | Wier |
| 4,692,567 A | * | 9/1987 | Crum ..................... 174/158 F |
| 4,708,323 A | | 11/1987 | Noakes |
| 4,725,825 A | | 2/1988 | McKean |
| 5,092,066 A | | 3/1992 | Brewster |
| 5,285,195 A | | 2/1994 | Way et al. |
| 5,848,488 A | | 12/1998 | Norwood |
| 5,850,808 A | | 12/1998 | Burdick |
| 6,209,853 B1 | | 4/2001 | Roy et al. |
| 6,283,064 B1 | | 9/2001 | Djukastein et al. |
| 6,459,381 B2 | | 10/2002 | Carson et al. |
| 2001/0011950 A1 | | 8/2001 | Carson et al. |
| 2001/0048102 A1 | | 12/2001 | Telles |

FOREIGN PATENT DOCUMENTS

| | | |
|---|---|---|
| EP | 0860116 A1 | 8/1998 |
| GB | 2295627 A | 6/1996 |
| JP | 200210 | 4/2002 |
| NZ | 239872 | 2/1995 |
| WO | WO 9633607 | 10/1996 |

* cited by examiner

Primary Examiner—Daniel P. Stodola
Assistant Examiner—Michael P. Ferguson
(74) Attorney, Agent, or Firm—Jacobson Holman PLLC

(57) ABSTRACT

A fence spacer for maintaining a pair of fence wires in a desired common plane and spaced a desired distance apart. The spacer may serve as a sign and include indicia thereon and, for electric fence wires, may include a light to indicate that the electric fence is functioning properly.

2 Claims, 7 Drawing Sheets

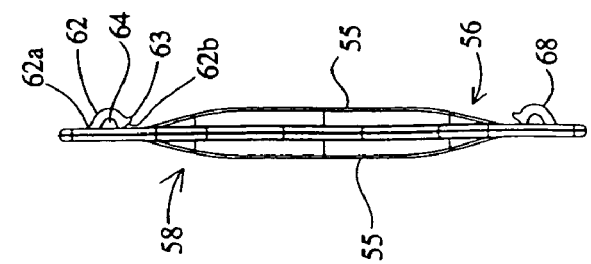
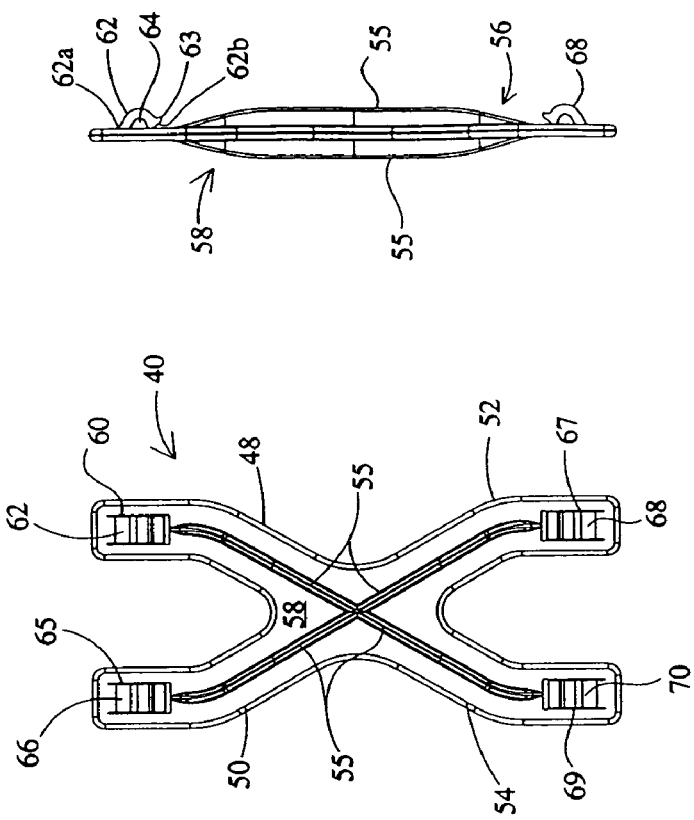
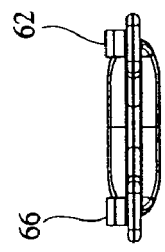
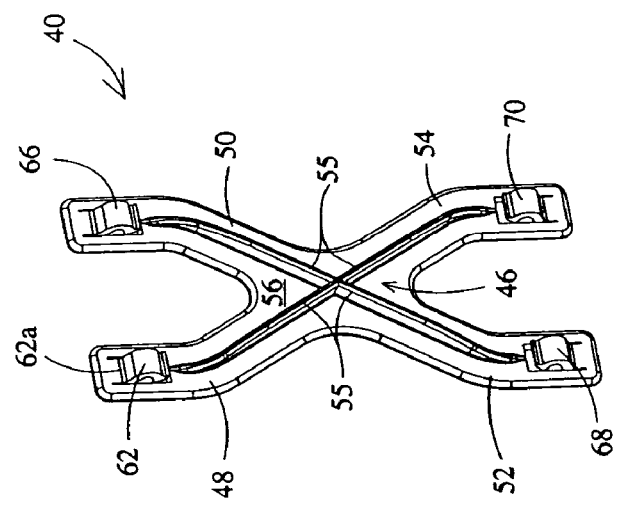

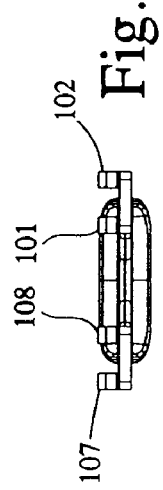
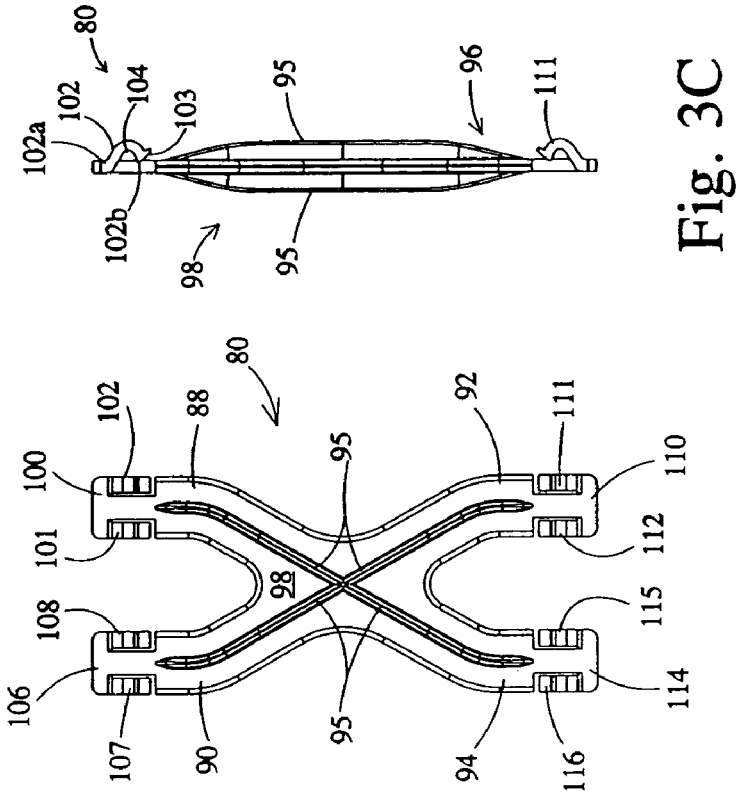
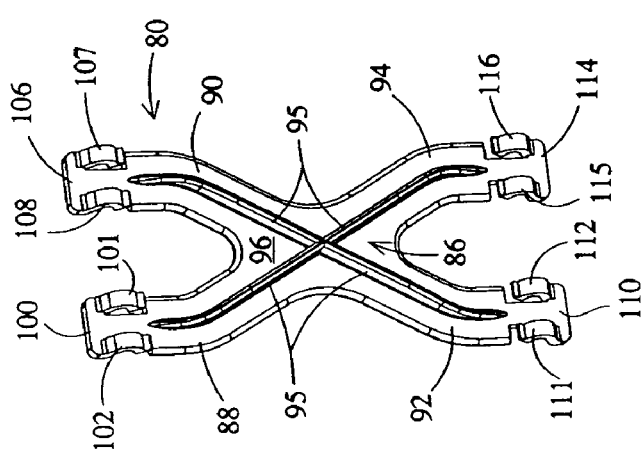

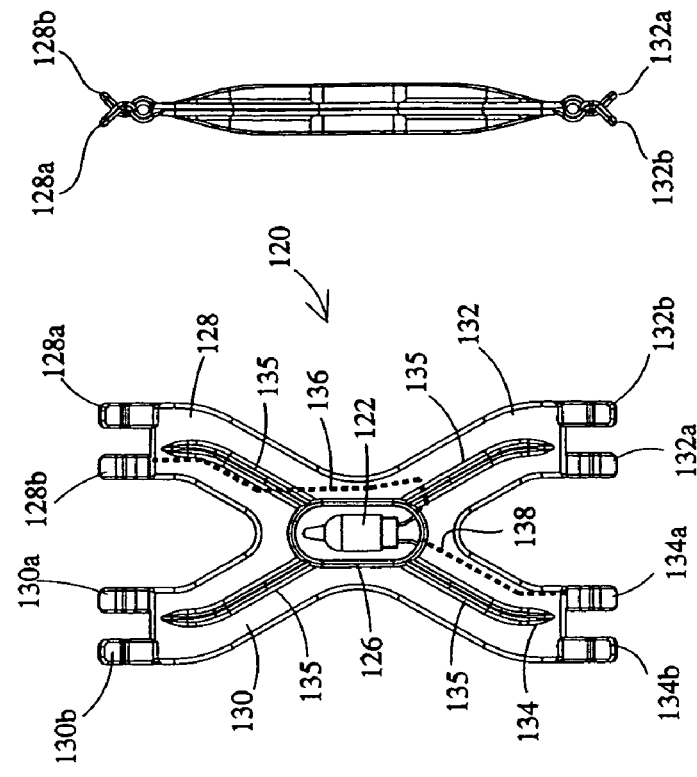
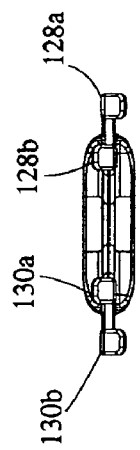
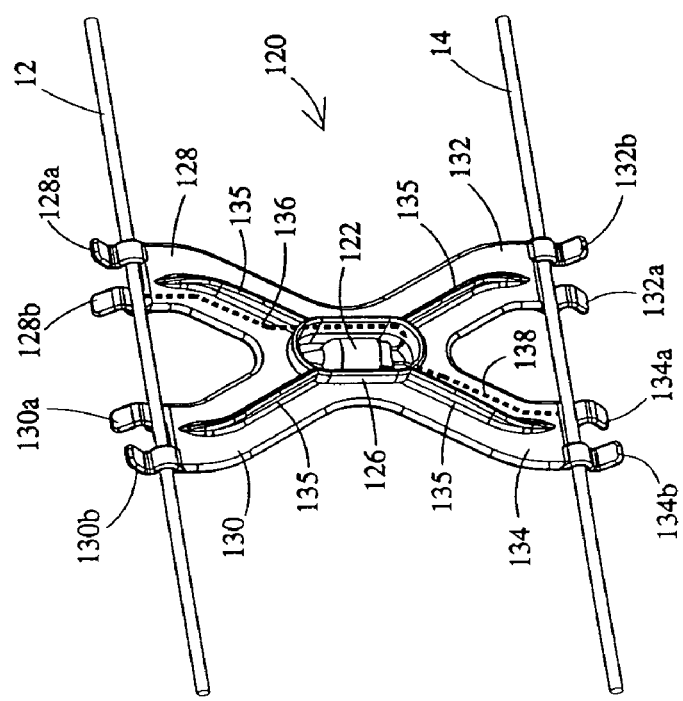

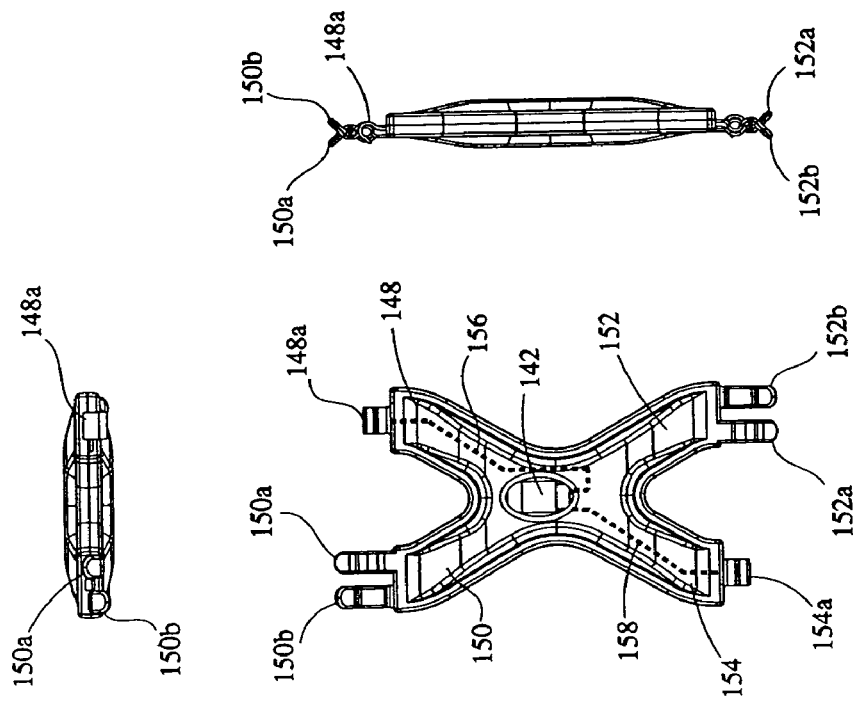
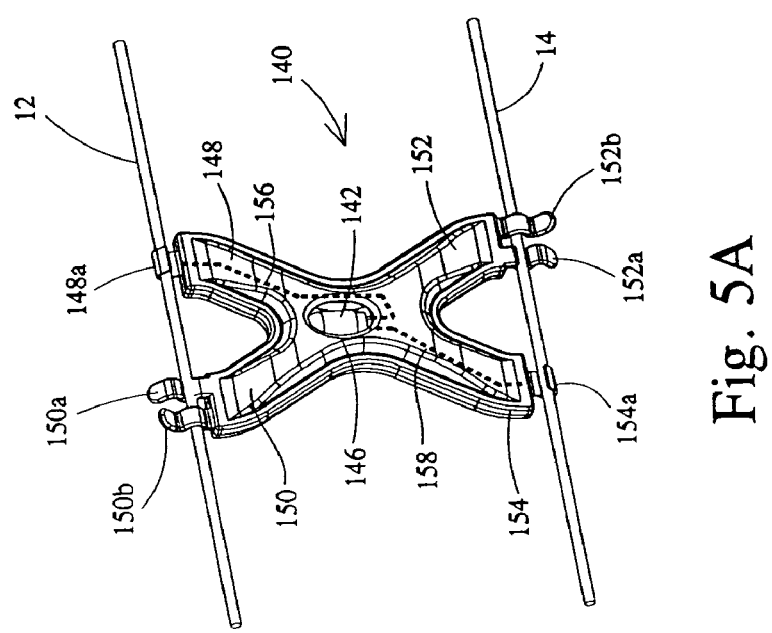

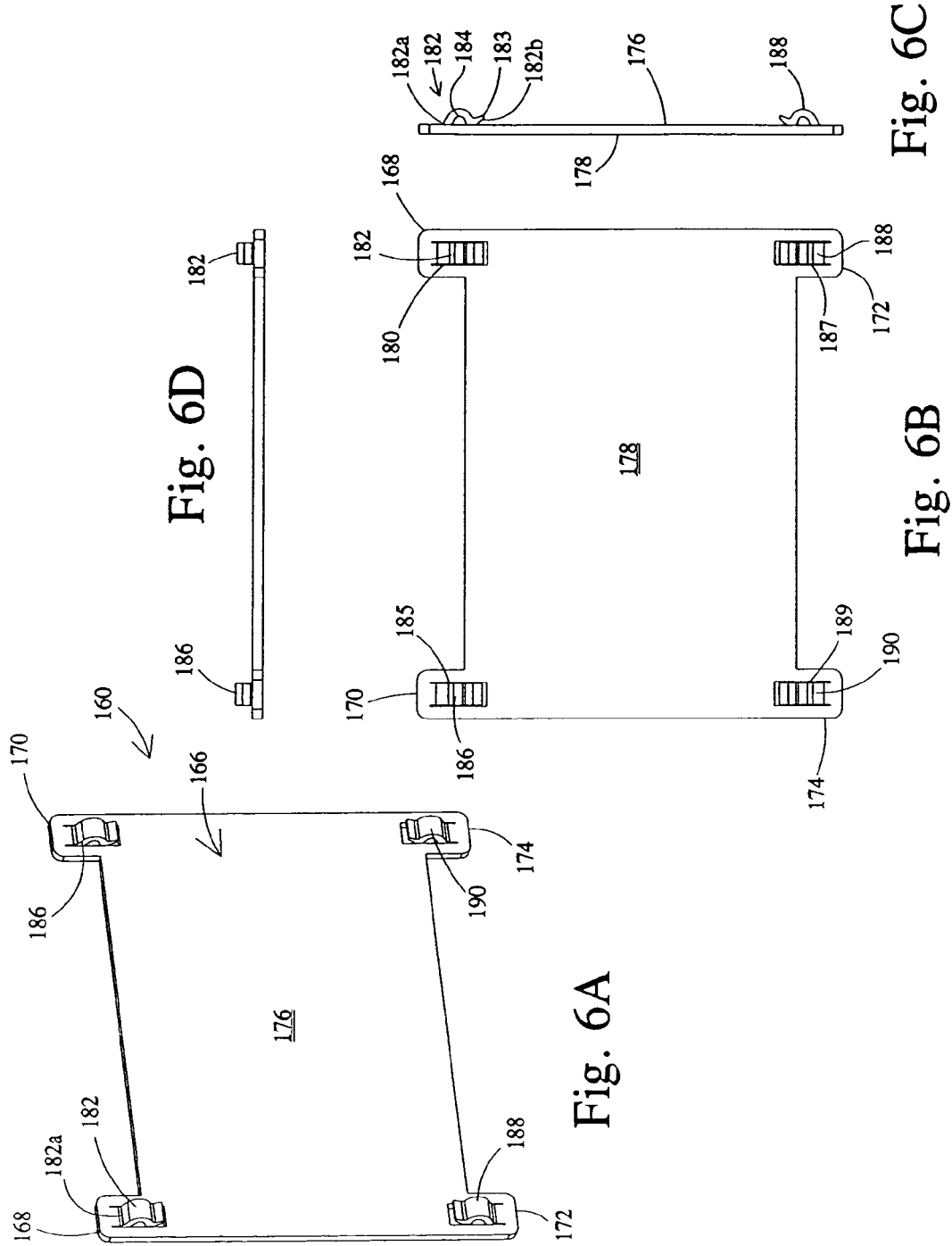

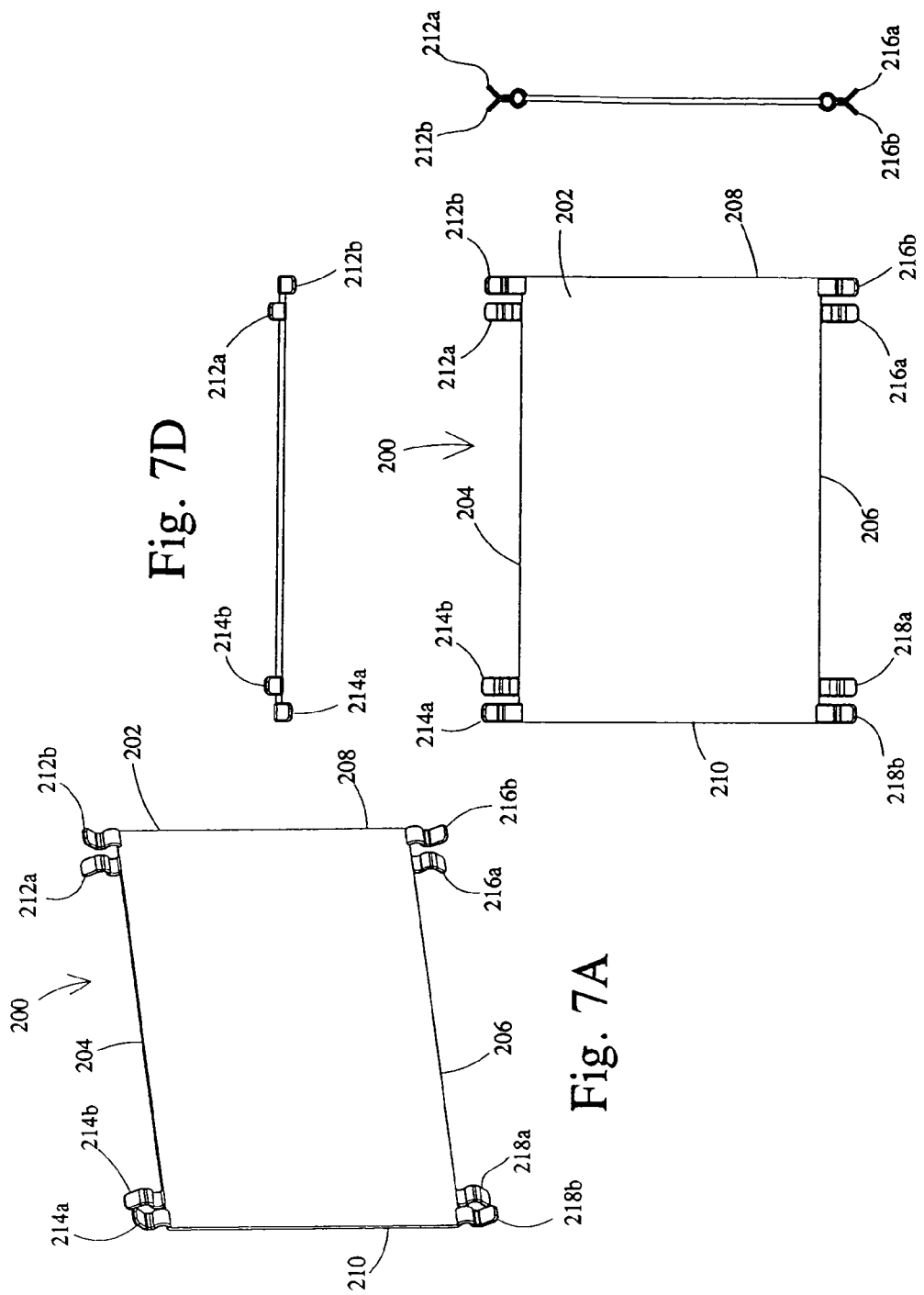

FENCE SPACER

FIELD OF THE INVENTION

This invention relates generally to devices for maintaining fence wires in a spaced apart relationship. More particularly, this invention relates to devices for maintaining wires of electric fences in a spaced apart relationship.

BACKGROUND AND SUMMARY OF THE INVENTION

Electric fences typically include a ground wire, a current carrying wire, and a source of electrical current. The ground wire and the current carrying wire are spaced apart and positioned parallel to one another. The spacing between the wires are such that an animal coming in contact with the fence will contact both wires. This creates a current path to complete the circuit such that the animal receives a mild electrical shock. It is important to prevent the ground wire and the current carrying wire from contacting one another and to maintain the wires in a desired spaced relationship so that an animal contacting the fence will be likely to simultaneously contact both wires so that a shock is received by the animal.

With regard to the foregoing, the present invention is directed to a fence spacer for maintaining a pair of fence wires in a desired common plane and spaced a desired distance apart.

In a preferred embodiment, the spacer includes a spacer body having first and second parallel edges positionable to be oriented substantially parallel to the desired common plane of the wires.

First and second pairs of generally S-shaped tabs are spaced apart and located along the first edge; and third and fourth pairs of generally S-shaped tabs are spaced apart and located along the second edge. The spacer is installed by snap-fitting the first and second pair of tabs onto a first one of the wires and snap-fitting the third and fourth pair of tabs onto a second one of the wires.

The first and second pairs of tabs maintain the first wire closely adjacent the first edge and the third and fourth pairs of tabs maintain the second wire closely adjacent the second edge.

In another aspect, the spacer includes a spacer body and a plurality of first loops configured to cradle a first one of the fence wires and a plurality of second loops configured to cradle a second one of the fence wires

BRIEF DESCRIPTION OF THE DRAWINGS

Further features of preferred embodiments of the invention will become apparent by reference to the detailed description of preferred embodiments when considered in conjunction with the figures, which are not to scale, wherein like reference numbers, indicate like elements through the several views, and wherein, FIGS. 1A–1D show a fence spacer in accordance with a preferred embodiment of the invention, wherein FIG. 1A is a frontal perspective view showing the spacer attached to wires, FIG. 1B is a right side view, FIG. 1C is a front plan view, and FIG. 1D is a top plan view.

FIGS. 2A–2D show a fence spacer in accordance with an alternate embodiment of the invention, wherein FIG. 2A is a frontal perspective view, FIG. 2B is a rear plan view, FIG. 2C is a side plan view, and FIG. 2D is a top plan view.

FIGS. 3A–3D show a fence spacer in accordance with still another embodiment of the invention, wherein FIG. 3A is a frontal perspective view, FIG. 3B is a rear plan view, FIG. 3C is a side plan view, and FIG. 3D is a top plan view.

FIGS. 4A–4D show a fence spacer incorporating an indicator lamp in accordance with a further embodiment of the invention, wherein FIG. 4A is a frontal perspective view showing the spacer attached to wires, FIG. 4B is a front plan view, FIG. 4C is a side view, and FIG. 4D is a top plan view.

FIGS. 5A–5D show another embodiment of a spacer incorporating an indicator lamp, wherein FIG. 5A is a frontal perspective view showing the spacer attached to wires, FIG. 5B is a front plan view, FIG. 5C is a side view, and FIG. 5D is a top plan view.

FIGS. 6A–6D show a fence spacer in accordance with a still further embodiment of the invention which is useful to also serve as a sign, wherein FIG. 6A is a frontal perspective view, FIG. 6B is a rear view, FIG. 6C is a side view, and FIG. 6D is a top view.

FIGS. 7A–7D show an alternate embodiment of a fence spacer configured to serve as a sign, wherein FIG. 7A is a frontal perspective view, FIG. 7B is a front plan view, FIG. 7C is a side view, and FIG. 7D is a top view.

DETAILED DESCRIPTION

Figure 1A:
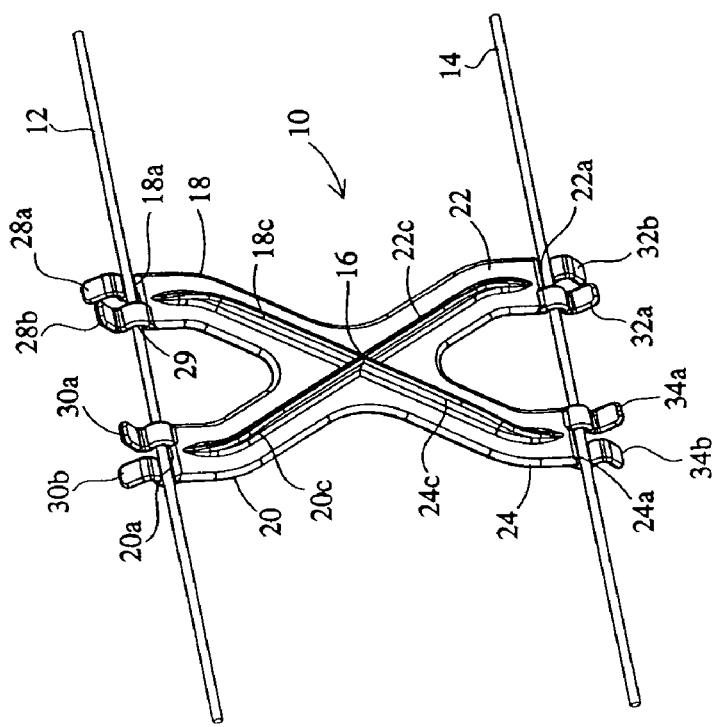
Figure 1B:
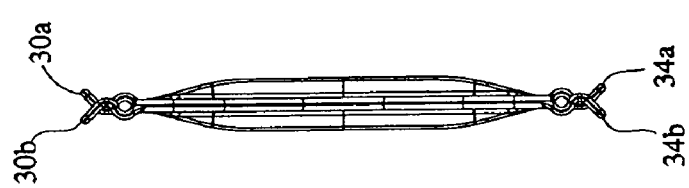
Figure 1C:
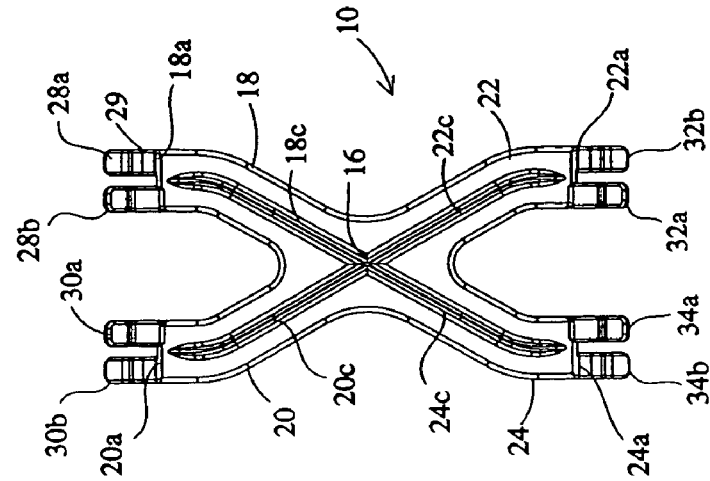
Figure 1D:
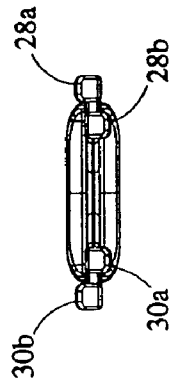

With initial reference to FIG. 1, there is shown a fence spacer 10 in accordance with a preferred embodiment of the invention. The spacer 10 is shown connected to ground wire 12 and current carrying wire 14 to maintain the wires 12 and 14 in a desired spaced apart relationship.

The spacer 10 is preferably of one-piece molded plastic construction and configured in a generally X-shaped configuration. The spacer 10 is advantageously thin, so as to be substantially flat, to facilitate packaging and shipping of multiple ones of the spacer. Each end of the X-shape includes a terminal edge oriented to be substantially parallel to the plane of the wires 12 and 14 and against which the wires rest. This is advantageous to maintain the wires 12 and 14 in a common plane and a fixed distance apart.

For example, spacer 10 includes a central portion 16, arms 18 and 20 which are parallel and spaced apart from one another extend away from the central portion 16 in a common direction, and arms 22 and 24 which are parallel and spaced apart from one another and extend away from the central portion 16 in a common direction diametrically opposed to the direction of the arms 18 and 20. Arm 18 includes a terminal edge 18a that is substantially parallel to the plane of wire 12 and against which the wire 12 rests when the spacer 10 is installed. Similarly, arms 20, 22, and 24 include terminal edges 20a, 22a, and 24a. Raised reinforcing ribs 18c, 20c, 22c, and 24c are preferably located on both sides of the spacer 10 for additional strength and anti-flexing properties.

To maintain the wires 12 and 14 closely adjacent the edges 18a, 20a, and 22a, 24a, respectively, each arm 18–24 includes a pair of somewhat flexible opposed tabs extending from adjacent opposite sides of the terminal edges 18a–24a and into which the wires snap-fit. For example, arm 18 includes generally S-shaped tabs 28a and 28b which extend generally away from the terminal edge 18a from opposite sides thereof. Each tab 28a and 28b is generally S-shaped so as to define a channel for cradling a portion of the wire 12. For example, tab 28a defines a channel 29 for cradling a portion of the wire 12. The tab 28b is similarly configured to include a channel. Arms 20, 22, and 24 include tabs 30a and 30b, 32a and 32b, and 34a and 34b, respectively. The tabs 30*a*, 30*b*, 32*a*, 32*b*, 34*a*, and 34*b* are preferably substantially identical to the tabs 28*a*–28*b*.

The spacer 10 may be quickly installed or removed from the wires 12 and 14 as by flexing the tabs to fit or remove the wires therefrom. Once installed, the tabs of the spacer inhibit movement of the wires away from the terminal edges of the arms and maintain the wires in a substantially fixed, spaced apart relationship, with the length of the wires oriented in a common plane.

Turning now to FIGS. 2A–2C, there is shown a spacer 40 in accordance with another embodiment of the invention for supporting wires, such as the wires 12 and 14 discussed previously. The spacer 40 is preferably of one-piece molded plastic construction and configured in a generally X-shaped configuration. Spacer 40 includes a central portion 46, arms 48 and 50 which are parallel and spaced apart from one another extend away from the central portion 46 in a common direction, and arms 52 and 54 which are parallel and spaced apart from one another and extend away from the central portion 46 in a common direction diametrically opposed to the direction of the arms 48 and 50. Raised reinforcing ribs 55 are preferably located on both generally planar sides 56 and 58 of the spacer 40 for additional strength and anti-flexing properties.

Each arm 48–54 includes a slot extending between the opposite sides 56 and 58 and a generally semi-circular loop extending from the side 56 thereof and into which the wires snap-fit. For example, arm 48 includes a slot 60 and a loop 62 having an end 62*a* extending from the side 56 and an opposite free end 62*b*, with the loop 62 generally oriented with the length of the slot 60 and configured to substantially span the length of the slot 60. The free end 62*b* preferably includes a projection 63 for contacting the wire during installation so as to urge the loop around the wire. The projection 63 also provides a surface for grasping by a user to urge the end 62*b* away from the side 56. The loop 62 is preferably substantially semi-circular so as to define a channel 64 for cradling a portion of the wire, such as the wire 12.

Arms 50, 52, and 54 are similarly configured, with arm 50 including slot 65 and loop 66, arm 52 including slot 67 and loop 68, and arm 54 including slot 69 and loop 70. The slots 65–69 are preferably substantially identical to the slot 60 and the loops 66–70 are preferably substantially identical to the loop 62. The loops 62 and 66 cradle a common wire, such as wire 12, and the loops 68 and 70 cradle a common wire, such as the wire 14. This enables the spacer 40 to maintain the wires in a substantially fixed, spaced apart relationship, with the length of the wires oriented in a common plane.

Turning now to FIGS. 3A–3D, there is shown a spacer 80 in accordance with another embodiment of the invention for supporting wires, such as the wires 12 and 14 discussed previously. The spacer 80 is preferably of one-piece molded plastic construction and configured in a generally X-shaped configuration. Spacer 40 includes a central portion 86, arms 88 and 90 which are parallel and spaced apart from one another extend away from the central portion 86 in a common direction, and arms 92 and 94 which are parallel and spaced apart from one another and extend away from the central portion 86 in a common direction diametrically opposed to the direction of the arms 88 and 90. Raised reinforcing ribs 95 are preferably located on both generally planar sides 96 and 98 of the spacer 80 for additional strength and anti-flexing properties.

Each arm 88–94 includes a generally T-shaped end segment, with a pair of generally semi-circular loops extending along the opposite sides of the T-shaped end segment and into which the wires snap-fit. For example, arm 88 includes a T-shaped end segment 100 and a pair of loops 101 and 102 along the sides of the segment 100. Each of the loops 101 and 102 is preferably substantially similar to the loop 62 described previously and includes and end 102*a* extending from the segment 100 and an opposite free end 102*b* and a projection 103, with the loop 102 defining a channel 104 for cradling a portion of the wire, such as the wire 12.

Arms 90, 92, and 94 are similarly configured, with arm 90 including T-shaped end segment 106 and loops 107 and 108, arm 92 including T-shaped end segment 110 and loops 111 and 112, and arm 94 including T-shaped end segment 114 and loops 115 and 116. The loops 101, 102, 107, and 108 cradle a common wire, such as wire 12, and the loops 111, 112, 115, and 116 cradle a common wire, such as the wire 14. This enables the spacer 80 to maintain the wires in a substantially fixed, spaced apart relationship, with the length of the wires oriented in a common plane.

With reference now to FIGS. 4A–4D, there is shown a fence spacer 120 in accordance with a still further preferred embodiment of the invention. The spacer 120 is preferably substantially identical to the spacer 10 described previously, except that it is further configured to include a light 122 which indicates that the fence onto which it is installed is functioning.

Spacer 120 includes a central portion 126, arms 128 and 130 which are parallel and spaced apart from one another extend away from the central portion 126 in a common direction, and arms 132 and 134 which are parallel and spaced apart from one another and extend away from the central portion 126 in a common direction diametrically opposed to the direction of the arms 128 and 130. Raised reinforcing ribs 135 are preferably located on both sides of the spacer 10 for additional strength and anti-flexing properties.

Each arm 128–134 includes opposed tabs into which the wires snap-fit. Arm 128 includes generally S-shaped tabs 128*a* and 128*b*, arm 130 includes tabs 130*a* and 130*b*, arm 132 includes tabs 132*a* and 132*b*, and arm 134 includes tabs 134*a* and 134*b*, respectively. The tabs 128*a*–134*b* preferably correspond to the tabs 28*a*–34*b* described previously, except that tabs 128*b* and 134*a* are made of an electrically conductive material or are coated with an electrically conductive material, such as copper or the like.

The tabs 128*b* and 134*a* are in electrical communication with the light 122 as by conductors, such as wires 136 and 138. The wires 136 and 138 are preferably embedded within the spacer 120, such as within the region of the ribs 135. Wire 136 electrically couples the tab 128*b* to the light 122 and the wire 138 electrically couples the tab 134*a* to the light 122. Accordingly, when the fence is functioning. e.g., the ground wire 12 provides a grounding effect and the powered wire 14 has power supplied thereto, the light 122 will be illuminated.

The light 122 may also serve to indicate the level of power supplied, as the level of illumination of the light may indicate an over or under supply of power to the wire 14. That is, if the power supply is malfunctioning and providing a lower power level, the light 122 will be dimmer than when the power is at the desired level. Likewise, if the light 122 is overly bright, it may indicate a power level higher than desired. Thus, the spacer 40 advantageously spaces the wires and further enables a user to visually check the operativeness of the fence.

With reference now to FIGS. 5A–5D, there is shown a fence spacer 140 in accordance with yet another preferred embodiment of the invention. The spacer 140 includes a light 142.

Spacer 140 includes a central portion 146, arms 148 and 150 which are parallel and spaced apart from one another extend away from the central portion 146 in a common direction, and arms 152 and 154 which are parallel and spaced apart from one another and extend away from the central portion 146 in a common direction diametrically opposed to the direction of the arms 148 and 150.

Each arm 148–154 includes structure which enables the spacer to be attached onto the wires. Arm 148 includes a generally U-shaped hook-shaped loop 148a, arm 150 includes S-shaped tabs 150a and 150b, arm 152 includes tabs 152a and 152b, and arm 154 includes loop 154a, respectively. The loops 148a and 154a are made of an electrically conductive material or are coated with an electrically conductive material, such as copper or the like.

The loops 148b and 154a are in electrical communication with the light 142 as by conductors, such as wires 156 and 158. The wires 156 and 158 are preferably embedded within the spacer 140. Wire 156 electrically couples the loop 148b to the light 142 and the wire 158 electrically couples the loop 154a to the light 142. Accordingly, when the fence is functioning. e.g., the ground wire 12 provides a grounding effect and the powered wire 14 has power supplied thereto, the light 142 will be illuminated. The light 142 may also function in other manners, such as described in connection with the light 122.

Turning now to FIGS. 6A–6D, there is shown a spacer 160 in accordance with another embodiment of the invention for supporting wires, such as the wires 12 and 14 discussed previously. The spacer 160 is preferably of one-piece molded plastic construction and includes a central portion 166, arms 168 and 170 which are parallel and spaced apart from one another extend away from the central portion 166 in a common direction, and arms 172 and 174 which are parallel and spaced apart from one another and extend away from the central portion 166 in a common direction diametrically opposed to the direction of the arms 168 and 170. The spacer 160 includes generally planar opposing sides 176 and 178. The sides 176 and 178 are preferably suitable to bear indicia so that the spacer 160 may also serve as a sign. For example, the sides 176 and 178 may include indicia indicating the presence of an electric fence, such as printed writing stating "Caution—Electric Fence."

Each arm 168–174 includes a slot extending between the opposite sides 176 and 178 and a generally semi-circular loop extending from the side 176 thereof and into which the wires snap-fit. For example, arm 168 includes a slot 180 and a loop 182 having an end 182a extending from the side 176 and an opposite free end 182b, with the loop 182 generally oriented with the length of the slot 180 and configured to substantially span the length of the slot 180. The free end 182b preferably includes a projection 183 for contacting the wire during installation so as to urge the loop around the wire. The projection 183 also provides a surface for grasping by a user to urge the end 182b away from the side 176. The loop 182 is preferably substantially semi-circular so as to define a channel 184 for cradling a portion of the wire, such as the wire 12.

Arms 170, 172, and 174 are similarly configured, with arm 170 including slot 185 and loop 186, arm 172 including slot 187 and loop 188, and arm 174 including slot 189 and loop 190. The slots 185–189 are preferably substantially identical to the slot 180 and the loops 186–190 are preferably substantially identical to the loop 182. The loops 182 and 186 cradle a common wire, such as wire 12, and the loops 188 and 190 cradle a common wire, such as the wire 14. This enables the spacer 160 to maintain the wires in a substantially fixed, spaced apart relationship, with the length of the wires oriented in a common plane.

Turning now to FIGS. 7A–7D, there is shown another embodiment of a spacer 200 which may also serve as a sign in the manner described in connection with spacer 160, and including indicia, such as writing indicating the presence of the electric fence.

The spacer 200 preferably includes a substantially rectangular planar body 202 having upper edge 204, lower edge 206 and opposed side edges 208 and 210.

Pairs of opposed tabs into which the wires snap-fit are located adjacent the upper and lower edges 204 and 206. As will be appreciated, the edges 204 and 206 are substantially parallel to the plane of the wires, such as the 12 and 14. The tabs are oriented to maintain the wires 12 and 14 in a common plane and a fixed distance apart. In this regard, the spacer 200 preferably includes a first pair of generally S-shaped tabs 212a and 212b along the edge 204 adjacent side 208 and a second pair of S-shaped tabs 214a and 214b along the edge 204 adjacent side 210. A third pair of generally S-shaped tabs 216a and 216b are located along the lower edge 206 adjacent side 208 and a fourth pair of S-shaped tabs 218a and 218b along the edge 206 adjacent side 210. The tabs 212a–218b preferably correspond to the tabs 28a–34b described previously in connection with spacer 10.

The foregoing description of certain exemplary embodiments of the present invention has been provided for purposes of illustration only, and it is understood that numerous modifications or alterations may be made in and to the illustrated embodiments without departing from the spirit and scope of the invention as defined in the following claims.

What is claimed is:

1. A fence spacer for maintaining a ground wire of a fence and an electrically powered wire of a fence in a desired common plane and spaced a desired distance apart, the spacer comprising a spacer body having first and second parallel edges positionable to be oriented substantially parallel to the desired common plane of the wires; a first pair of generally S-shaped tabs along the first edge, one of which is electrically conductive; a second pair of generally S-shaped tabs along the first edge and spaced apart from the first pair of tabs; a third pair of generally S-shaped tabs located along the second edge, one of which is electrically conductive; a fourth pair of generally S-shaped tabs along the second edge and spaced apart from the third pair of tabs, an electrically powerable light source positioned adjacent the spacer body, a first conductor extending between the electrically conductive tab of the first pair of tabs and the light source and a second conductor extending between the electrically conductive tab of the third pair of tabs and the light source, wherein the spacer is installed by snap-fitting the first and second pair of tabs onto a first one of the wires and snap-fitting the third and fourth pair of tabs onto a second one of the wires, with the first and second pairs of tabs maintaining the first wire closely adjacent the first edge and the third and fourth pairs of tabs maintaining the second wire closely adjacent the second edge such that when the fence is functioning the light will be illuminated.

2. A fence spacer for maintaining a ground wire and an electrically powered wire of a fence in a desired common plane and spaced a desired distance apart, the spacer comprising a spacer body having first and second parallel edges positionable to oriented to be substantially parallel to the desired common plane of the wires; a first wire retaining member along the first edge and being electrically conductive; a second wire retaining member along the first edge and spaced apart from the first wire retaining member; a third wire retaining member located along the second edge and being electrically conductive; a fourth wire retaining member along the second edge and spaced apart from the third wire retaining member, an electrically powerable light source positioned adjacent the spacer body, a first conductor extending between the first wire retaining member and the light source, and a second conductor extending between the third wire retaining member and the light source, wherein the spacer is installed by snap-fitting the first and second wire retaining members onto a first one of the wires and snap-fitting the third and fourth wire retaining members onto a second one of the wires, with the first and second wire retaining members maintaining the first wire closely adjacent the first edge and the third and fourth wire retaining members maintaining the second wire closely adjacent the second edge such that when the fence is functioning the light will be illuminated.

\* \* \* \* \*